United States Patent [19]

Westover

[11] Patent Number: 4,679,905
[45] Date of Patent: Jul. 14, 1987

[54] LINEAR ADJUSTMENT APPARATUS

[75] Inventor: Dwight G. Westover, Sierra Madre, Calif.

[73] Assignee: Bell & Howell Company, Skokie, Ill.

[21] Appl. No.: 762,198

[22] Filed: Aug. 2, 1985

[51] Int. Cl.[4] .......................... G02B 7/04; F16H 25/18
[52] U.S. Cl. ........................................ 350/255; 74/110
[58] Field of Search ................................ 350/252, 255;
355/44–45, 55, 60–63; 353/76, 101; 250/239;
382/45, 65, 67, 68; 358/293–294; 74/99 R, 110

[56] References Cited

U.S. PATENT DOCUMENTS

| 1,787,808 | 1/1931 | Wittel | 353/101 |
| 1,954,876 | 4/1934 | Joannides | 353/101 |
| 2,428,719 | 10/1947 | Nemeth | 350/255 |
| 2,429,164 | 10/1947 | Mast et al. | 350/255 |
| 2,865,274 | 12/1958 | Richartz | 350/255 |
| 3,480,349 | 11/1969 | Himmelsbach | 350/429 |
| 3,957,355 | 5/1976 | Reinsch et al. | 350/255 |
| 4,318,135 | 3/1982 | Allis et al. | 250/239 |
| 4,457,017 | 6/1984 | Onogi et al. | 382/65 |
| 4,488,039 | 12/1984 | Sato et al. | 250/578 |
| 4,571,637 | 2/1986 | Thoone | 350/294 |

FOREIGN PATENT DOCUMENTS

| 102821 | 8/1979 | Japan | 358/294 |
| 51155 | 5/1981 | Japan | 358/294 |
| 158574 | 12/1981 | Japan | 358/294 |
| 1324074 | 7/1973 | United Kingdom | 355/55 |

*Primary Examiner*—William H. Punter
*Attorney, Agent, or Firm*—David Weiss

[57] ABSTRACT

Apparatus for linearly adjusting the position of devices, and in particular, apparatus for adjusting focus of an image on a light sensitive surface of an image sensor device included in an optical character recognition read head. The apparatus includes a first mechanism for adjustably positioning a lens assembly for adjusting focus at the image plane, and a second device for adjustably supporting the image sensor device for adjusting the position of its light sensitive surface to coincide with the plane of the focused image.

13 Claims, 7 Drawing Figures

LINEAR ADJUSTMENT APPARATUS

BACKGROUND OF THE INVENTION

This invention relates to apparatus for linearly adjusting the position of devices, and more particularly to such apparatus for adjusting focus of an image generated by an optical character recognition (OCR) read head. The apparatus includes a mechanism for adjusting position of a lens assembly along its optical axis for focusing the lens image at an image plane, and a mechanism for adjustably supporting an image scanning device for receiving the focused image.

In many optical systems for generating and receiving an image, the degree of focus of the received image is critical for its optimum utilization. For example, in OCR systems of the type employing an optoelectronic device situated in the image plane, the output signal generated from the image is enhanced with the degree of image focus. Such systems typically include a read head having a lens assembly positioned for viewing optical characters situated in an object plane, for generating images of such characters at the read head's image plane. Apparatus for supporting the read head with respect to the object plane are not part of the present invention, and such apparatus is disclosed in applicant's copending U.S. patent application Ser. No. 712,014.

The optoelectronic device of this type of read head may comprise a solid state image sensor device or scanning array, with its light sensitive surface optimally situated in the image plane of the lens assembly. The focus of the image on the light sensitive surface may be adjusted by displacing the lens assembly along its optical axis, as well as by displacing the array along the optical axis such that its light sensitive surface is at the plane of the focused image. Such adjustments are desirable when initially setting up the OCR system, and subsequently to compensate for minor shifts of the object plane with respect to the OCR read head.

SUMMARY OF THE INVENTION

In an optoelectronic environment, the present invention provides apparatus for adjusting focus of an optical image at the light sensitive surface of an image sensor device. An OCR read head housing or optics block includes means for displacing an included lens assembly along its optical axis, together with means for supporting and linearly repositioning the image sensor device with respect to the lens assembly, for adjusting focus of the image appearing at the light sensitive surface.

The lens assembly is slidably mounted in the optics block, and a bellcrank is mounted in the block and is adapted for linearly displacing the lens assembly along its optical axis. The bellcrank includes a rotary member rotatably mounted in the block about an axis perpendicular to the lens assembly optical axis. The rotary member includes an eccentric engageable with the lens assembly for linearly displacing the lens assembly along its optical axis when the rotary member is rotatably displaced and the lens assembly is biased to engage the eccentric. The rotary member includes lever means in contact with a linearly positionable member. The rotary member is rotatably displaced about its axis when the linearly positionable member is repositioned along a line perpendicular to the rotary member axis but displaced therefrom. Restraining means is provided for restraining linear displacement of the rotary member along its axis.

The apparatus for adjustably supporting the image sensor device includes support means for supporting the image sensor device, to which is attached two guide rods parallel to one another and perpendicular to the light sensitive surface of the image sensor device. Two guide shafts are arranged in the optics block parallel to the optical axis of the lens assembly, for receiving the guide rods such that the light sensitive surface of the image sensor device is positioned to receive the image from the lens assembly. Adjustable means, such as a set-screw, cooperates with the support means and the block for adjustably maintaining position of the guide rods within the shafts. The set-screw is aligned parallel to the shafts such that threaded adjustment of the set-screw coerces the support means—and hence the image sensor device—to be repositioned along the optical axis of the lens assembly.

BRIEF DESCRIPTION OF THE DRAWINGS

The novel features which are believed to be characteristic of the invention, together with further advantages thereof, will be better understood from the following description considered in connection with the accompanying drawings in which a preferred embodiment of the invention is illustrated by way of example, and wherein like reference numerals are utilized to indicate like components. It is to be expressly understood, however, that the drawings are for the purpose of illustration and description only and are not intended as a definition of the limits of the invention.

DESCRIPTION OF THE PREFERRED EMBODIMENT

Figure 1:
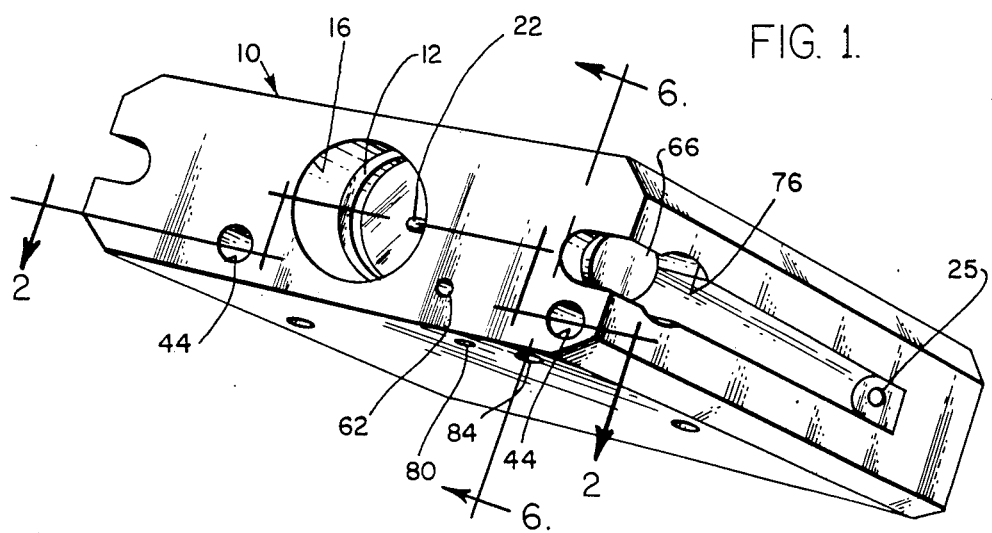
FIG. 1 is a perspective view of an optics block of an optical character recognition read head according to the present invention, shown with the image sensor device and its supporting structure removed.
Figure 2:
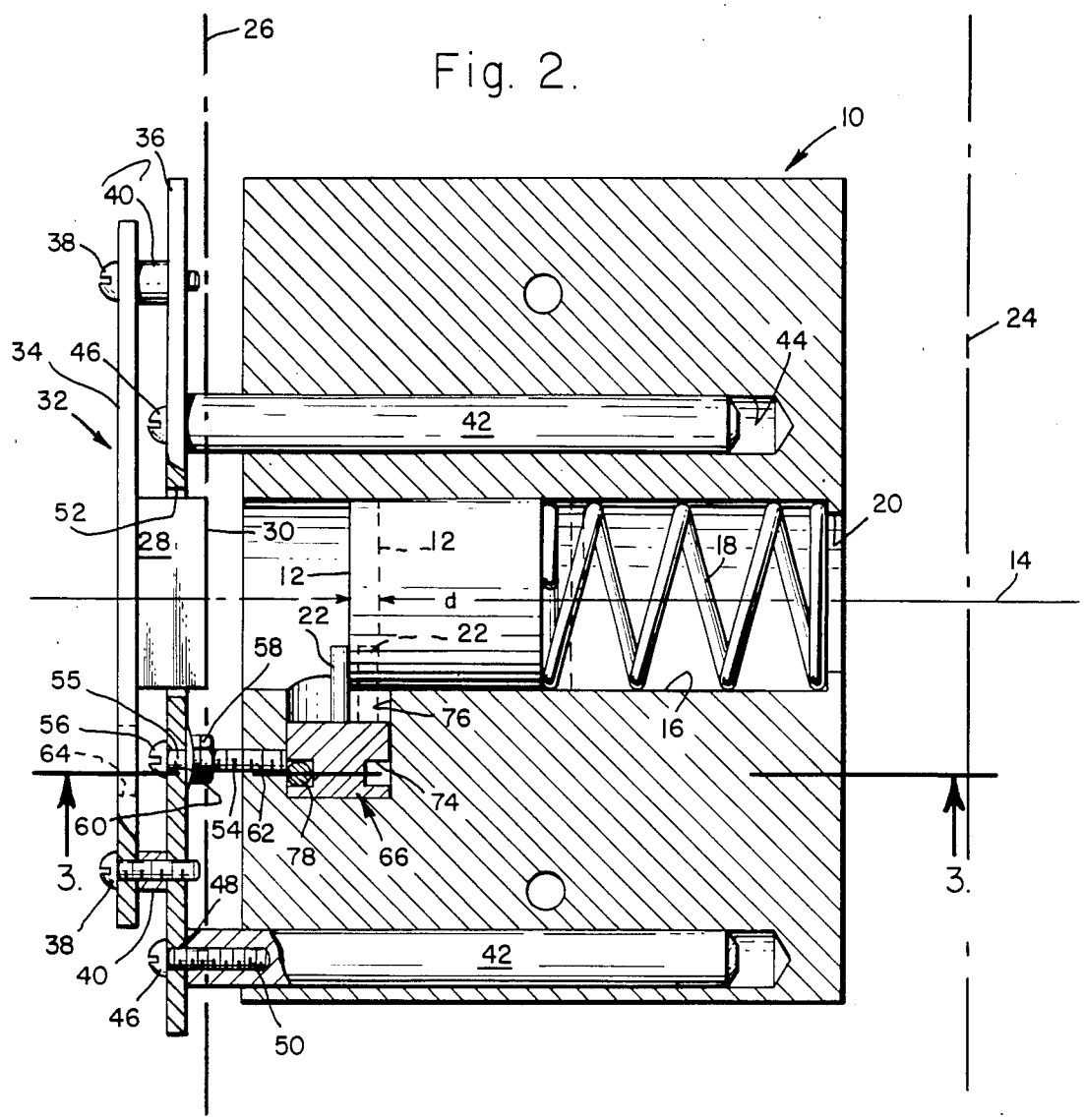
FIG. 2 is a part cross-sectional view of the apparatus of FIG. 1, viewed along the line 2—2 of FIG. 1 in the direction of the appended arrows, shown with the image sensor device and its supporting structure in place.
Figure 3:
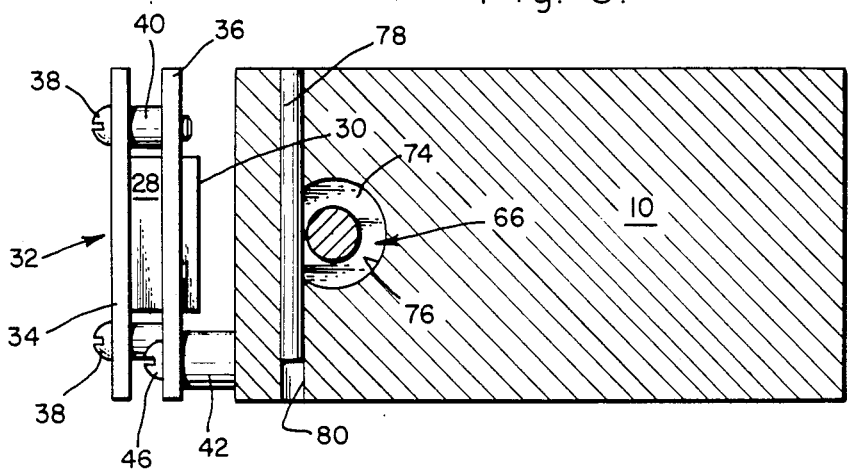
FIG. 3 is a part cross-sectional view of the apparatus of FIG. 1, viewed along the line 3—3 of FIG. 2 in the direction of the appended arrows, shown with the image sensor device and its supporting structure in place.

Turning to FIGS. 1, 2 and 3, there is shown a housing or an optics block 10 included in an optical character recognition read head. An optical image generating device such as a lens assembly 12 having an optical axis 14, is slidably mounted in the block 10 within a bore or cylindrical passage 16 extending along the optical axis 14. Biasing means such as a compression spring 18 is situated within the cylindrical passage 16, for being compressed between an endlip 20 and and the lens assembly 12 which in turn is engaged by a pin 22 for controlling axial displacement of the lens assembly 12 as will be discussed later.

The optics block 10 is normally positioned during use such that the optical axis 14 of the lens assembly 12 is perpendicular to an object plane 24 containing indicia or characters to be read by the OCR read head. The OCR read head may be supported, for example, in the manner shown in applicant's co-pending U.S. patent application Ser. No. 712,014, utilizing apertures 25 for this purpose. In any event, the optics block 10 is positioned such that the lens assembly 12 generates images at an image plane 26 of the characters situated in the object plane 24.

An optoelectronic or image sensor device 28 is situated with its light sensitive surface 30 optimally positioned in the image plane 26 for receiving the character images. The optoelectronic device is preferably a solid state image sensor array, such as the self scanning photo diode arrays manufactured by EG&G Reticon of Sunnyvale, Calif. An acceptable image sensor device 28 is sold by EG&G Reticon under the designation LR64A, and contains 64 photo diodes which are internally scanned to provide a video signal output. The quality of the video signal output is related to the degree of image focus at the scanning array, and the present invention provides easily adjustable means for supporting the image sensor device 28 while refining focus of the image at its light sensitive surface 30.

One aspect of the invention includes a support structure 32 for supporting the image sensor device 28 at the plane of the focused image. A printed circuit board 34, to which the image sensor device 28 is mounted and which also may contained associated electronic circuitry and components (not shown), is secured to a support plate 36, for example by means of screws 38 with spacers 40 between the board 34 and the plate 36. Two guide rods 42 are affixed at one of their respective ends to the support plate 36, by such means as screws 46 extending through apertures 48 in the plate 36 and threadably engaging tapped holes 50 in the rods 42. The guide rods 42 are perpendicularly positioned with respect to the support plate 36, while the circuit board 34 is positioned parallel to the support plate 36. An aperture 52 is located in the support plate 36 such that the light sensitive surface 30 of the image sensor device 28 may be accessible to the image path of the optics block 10 when the guide rods 42 have been inserted respectively in two guide shafts 44 in the optics block 10.

The guide shafts 44 are situated in the optics block 10 such that they are parallel to the optical axis 14 of the lens assembly 12. The guide rods 42 are attached to the support plate 36 in locations where the guide rods 42 may slidably mate with the guide shafts 44, and the diameters of the guide rods 42 and the guide shafts 44 are such that the circumferential surfaces of the guide rods 42 and of the guide shafts 44 are in sliding engagement while the guide rods 42 are maintained by the guide shafts 44 without significant lateral movement of the rods 42 with respect to their respective shafts 44.

The depth of the guide rods 42 within the guide shafts 44 is adjustably maintained by means of a set screw 54 extending through an aperture 55 in the support plate 36 and retained therein by means of a set screw head 56 on one side of the support plate 36 and a pair of jam nuts 58 on the other side of the support plate 36. A spring washer 60 may be situated between the jam nuts and the support plate for avoiding backlash.

A threaded aperture 62 is situated in the optics block 10 for receiving the set screw 54. The aperture 62 is aligned parallel to the guide shafts 44, while the set screw 54 is aligned parallel to the guide rods 42. When the set screw 54 is threadably engaged with tapped aperture 62 and set by means of the jam nuts 58, the position of the support structure 32 is maintained with respect to the optics block 10, with the light sensitive surface 30 of the image sensor device 28 intersecting and perpendicular to the optical axis 14 of the lens assembly 12. The distance between the supporting circuit board 34 and the optics block 10 may be adjusted by adjustment of the set screw 54 by such means as a screw driver inserted through an appropriately situated aperture 64 in the circuit board 34 to cooperate with the set screw head 56.

It is apparent that adjustment of the set screw 54 will cause the light sensitive surface 30 of the image sensor device 28 to be correspondingly displaced along the optical axis 14 of the lens assembly 12, thereby permitting focus adjustment of the image falling on the light sensitive surface 30 of the image sensor device 28.

Turning to FIGS. 4, 5, 6 and 7, in addition to FIGS. 1, 2 and 3, there is shown a bellcrank device 66 for linearly adjusting position of the lens assembly 12 along its optical axis 14. As may be best seen in FIGS. 4 and 5, the bellcrank 66 is a right circular cylinder 67 with an axis 68, having a cut-out portion terminating at a flat surface 70 parallel to the cylinder axis 68 and intersecting parallel chords 72 of the cylinder 67, the chords 72 preferably being diameters of the cylinder 67 as shown in the drawings. The cylinder 67 further includes an annular groove 74.

The bellcrank 66 may also be viewed as first and second co-axial cylinders 67a, 67b, with a connecting member 69 connecting the first and second cylinders 67a, 67b and having a flat surface 70 intersecting parallel chords 72 of the first and second cylinders 67a, 67b. The second cylinder 67b includes the annular groove.

Figure 5:
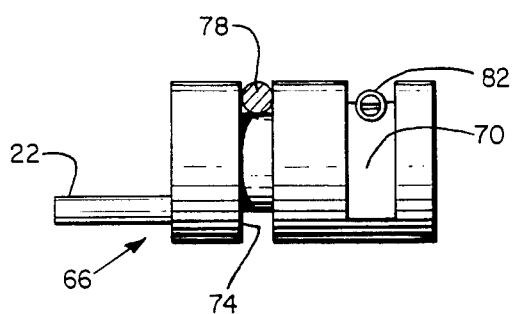
FIG. 5 is an elevation view of the bellcrank of FIG. 4, shown with its cooperating set screw and retaining pin.
Figure 7:
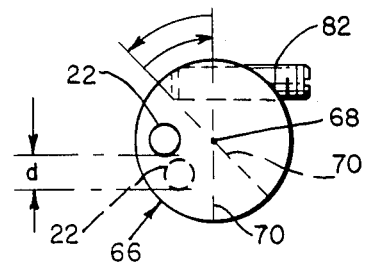
FIG. 7 is an end view of the apparatus of FIGS. 5 and 6, indicating operation of the bellcrank.
Figure 6:
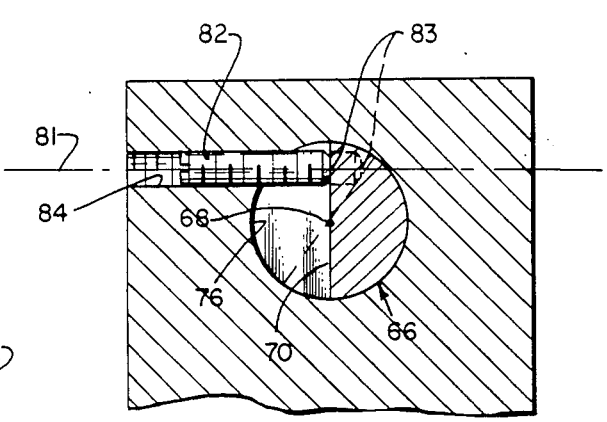
FIG. 6 is a fragmentary part cross-sectional view of the apparatus of FIG. 1, viewed alone the line 6—6 in the direction of the appended arrows, indicating operation of the bellcrank.
Figure 4:
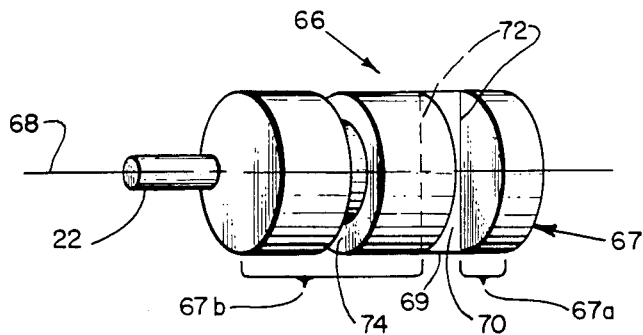
FIG. 4 is a perspective view of a bellcrank according to the present invention.

A pin 22 protrudes from one end of the bellcrank 66, and is aligned parallel to and eccentrically with respect to the cylinder axis 68. As shown in FIGS. 4, 5 and 7, the eccentric pin 22 is preferably positioned near the circumference of the cylinder 67.

As may be seen in FIGS. 1, 2, 3 and 6, the cylindrical bellcrank 66 is rotatably mounted in the optics block 10, with the cylinder axis 68 perpendicular to the optical axis 14 of the lens assembly 12, and with the eccentric pin 22 extending into the cylindrical passage 16 and engageable with the lens assembly 12. The cylindrical bellcrank 66 is rotatably situated within a bore 76 extending to the cylindrical passage 16 and aligned perpendicular to the lens assembly optical axis 14. The bellcrank 66 is restrained from movement along its axis 68 by means of a pin 78 retained by a bore 80 in the optics block 10 and extending through the annular groove 74 of the cylindrical bellcrank 66. The restraining pin 78 is aligned perpendicular to the cylinder axis 68 such that the cylindrical bellcrank 66 is permitted to rotate about its axis 68. The location of the restraining pin bore 80 permits the restraining pin 78 to restrain movement of the bellcrank 66 along its axis 68, while positioning the eccentric pin 22 to engage the lens assembly 12.

A linearly positionable member, such as a set screw 82 having a longitudinal axis 81, is carried by the optics block 10, and is positionable along a line coincident with the longitudinal axis 81 which is perpendicular to and displaced from the cylindrical axis 68 of the bellcrank 66, such as by means of a tapped bore 84. The position of the bore 84 is such that the point end 83 of the set screw 82 contacts the flat surface 70 of the bellcrank 66 at a point displaced from the cylinder axis 68.

As shown in FIG. 2, the compression spring 20 biases the lens assembly 12 against the eccentric pin 22 of the bellcrank 66. When in a first position shown by solid lines in FIGS. 2, 6 and 7, the eccentric pin 22 is restrained from movement by means of the point end 83 of the screw 82 contacting the flat surface 70 of the bellcrank 66. Adjustment of the set screw 82, as shown in phantom in FIGS. 6 and 7, causes its point end 83 to be Z4 linearly displaced, coercing the flat surface 70 to function as a lever causing rotational displacement or pivoting of the bellcrank 66 about its cylindrical axis 68. This in turn causes the eccentric pin 22 to be linearly displaced through a distance d parallel to the optical axis 14 of the lens assembly 12. Displacement of the eccentric 22 causes similar displacement of the lens assembly 12 along its optical axis 14, further compressing the spring 18. By reversing adjustment of the linearly positionable set screw 82 (i.e., to the left as viewed in FIG. 6), reverse rotational displacement of the bellcrank 66 results as the eccentric 22 is coerced by the compression spring 18 acting upon the lens assembly 12. The eccentric 22 is thereby caused to move a linear distance associated with the pivot angle of the flat surface 70 determined by the position of the set screw's point end 83 in contact with the flat surface 70. In this manner, the lens assembly 12 may be adjustably displaced along its optical axis 14, for adjusting focus of the lens image at the image plane 26.

The optics block 10, the guide rods 42 and the bellcrank 66 are preferably made of hardened anodized aluminum or hardened steel to produce wear resistant surfaces, and to which a preferably dry lubricant has been applied, for example molybdenum disulphide such as sold under the trademark MicroSeal 100-1.

Thus, there has been shown apparatus for adjusting focus of an image on a light sensitive surface of an image sensor device included in an OCR read head. The apparatus includes novel means for adjustably positioning a lens assembly for adjusting focus at the lens assembly image plane, and novel means for adjustably supporting the image sensor device for adjusting the position of its light sensitive surface to coincide with the plane of the focused image. Other embodiments of the invention, and modifications and variations of the embodiments presented, may be developed without departing from the essential characteristics thereof. Accordingly, the invention should be limited only by the scope of the claims appended below.

I claim:

1. Image focus adjustable apparatus, comprising in combination:
    an optics block;
    an optical image generating device having an optical axis and slidably mounted in said housing along said optical axis;
    a rotary member rotatably mounted in said optics block about an axis perpendicular to said optical axis and having an eccentric engageable with said optical device for displacing said optical device along said optical axis when said rotary member is rotatably displaced and said eccentric is engaged with said optical device;
    restraining means carried by said optics block for restraining displacement of said rotary member along said rotary member axis;
    biasing means carried by said optics block for biasing said optical device to engage said eccentric;
    linearly positionable means carried by said optics block and adjustably positionable along a line perpendicular to said rotary member axis and displaced therefrom;
    lever means carried by said rotary member and adapted for contact with said linearly positionable means such that said rotary member is rotatably displaced when said linearly positionable means is linearly repositioned;
    image receiving means for receiving an image generated by said image generating means; and
    adjustable support means carried by the optics block for supporting said image receiving means and for adjusting position thereof along said optical axis.

2. Image focus adjustable apparatus, comprising in combination:
    an optics block;
    an optical image generating device having an optical axis and slidably mounted in said housing along said optical axis;
    a rotary member rotatably mounted in said optics block about an axis perpendicular to said optical axis and having an eccentric engageable with said optical device for displacing said optical device along said optical axis when said rotary member is rotatably displaced and said eccentric is engaged with said optical device;
    restraining means carried by said optics block for restraining displacement of said rotary member along said rotary member axis;
    biasing means carried by said optics block for biasing said optical device to engage said eccentric;
    linearly positionable means carried by said optics block and adjustably positionable along a line perpendicular to said rotary member axis and displaced therefrom; and
    lever means carried by said rotary member and adapted for contact with said linearly positionable means such that said rotary member is rotatably displaced when said linearly positionable means is linearly repositioned.

3. Apparatus according to claims 1 or 2, above, wherein said linearly positionable means comprises a set screw threadedly retained in said optics block and having a longitudinal axis coincident with said line.

4. Apparatus according to claims 1 or 2, above, wherein said lever means includes a flat surface of said rotary member intersecting parallel chords of said rotary member.

5. Apparatus according to claims 1 or 2, above, wherein said rotary member includes first and second co-axial cylinders, and said lever means includes a member connecting said cylinder and having a flat surface intersecting parallel chords of said cylinders.

6. Apparatus according to claims 1 or 2, above, wherein said rotary member includes first and second co-axial cylinders, and said lever means includes a member connecting said cylinders and having a flat surface intersecting parallel diameters of said cylinders.

7. Image focus adjustable optical apparatus, comprising in combination:

an optics block;

an optical image generating device having an optical axis and slidably mounted in said optics block along said optical axis;

a cylinder rotatably mounted in said optics block about an axis perpendicular to said optical axis and having an eccentric engageable with said optical device, said cylinder having a cut out portion terminating at a flat surface parallel to said cylinder axis and intersecting parallel chords of said cylinder, and said cylinder further having an annular groove therein;

a pin carried by said optics block and cooperating with said annular groove for restraining displacement of said cylinder along said cylinder axis;

biasing means carried by said optics block for biasing said optical device to engage said eccentric;

linearly positionable means carried by said housing and adjustably positionable along a line perpendicular to said cylinder axis and displaced therefrom, for contacting said flat surface such that said cylinder is rotatably displaced when said linearly positionable means is linearly repositioned;

image receiving means for receiving an image generated by said image generating means; and adjustable support means carried by said optics block for supporting said image receiving means and for adjusting position thereof along said optical axis.

8. Image focus adjustable optical apparatus, comprising in combination:

an optics block;

an optical image generating device having an optical axis and slidably mounted in said optics block along said optical axis;

a cylinder rotatably mounted in said optics block about an axis perpendicular to said optical axis and having an eccentric engageable with said optical device, said cylinder having a cut out portion terminating at a flat surface parallel to said cylinder axis and intersecting parallel chords of said cylinder, and said cylinder further having an annular groove therein;

a pin carried by said optics block and cooperating with said annular groove for restraining displacement of said cylinder along said cylinder axis;

biasing means carried by said optics block for biasing said optical device to engage said eccentric;

linearly positionable means carried by said housing and adjustably positionable along a line perpendicular to said cylinder axis and displaced therefrom, for contacting said flat surface such that said cylinder is rotatably displaced when said linearly positionable means is linearly repositioned.

9. Apparatus according to claims 7 or 8, above, wherein said linearly positionable means includes a set screw threadedly mounted in said optics block along said line and having a point end contacting said flat surface.

10. Apparatus for linearly adjusting position of a device, comprising in combination:

a housing having means therein slidably mounting the device along a linear path;

a rotary member rotatably mounted in said housing about an axis perpendicular to said path and having an eccentric engageable with said device for displacing said device along said path when said rotary member is rotatably displaced and said eccentric is engaged with said device;

restraining means carried by said housing for restraining displacement of said rotary member along said rotary member axis;

biasing means carried by said housing for biasing said device to engage said eccentric;

linearly positionable means carried by said housing and adjustably positionable along a line perpendicular to said rotary member axis and displaced therefrom ; and lever means carried by said rotary member and adapted for contact with said linearly positionable means such that said rotary member is rotatably displaced when said linearly positionable means is linearly repositioned.

11. Apparatus for linearly adjusting position of a device, comprising in combination:

a housing having means therein slidably mounting the device along a linear path;

a cylinder rotatably mounted in said optics block about an axis perpendicular to said path and having an eccentric engageable with said device, said cylinder having a cut out portion terminating at a flat surface parallel to said cylinder axis and intersecting parallel chords of said cylinder, and said cylinder further having an annular groove therein;

a pin carried by said housing and cooperating with said annular groove for restraining displacement of said cylinder along said axis;

biasing means carried by said housing for biasing said optical device to engage said eccentric;

linearly positionable means carried by said housing and adjustably positionable along a line perpendicular to said axis and displaced therefrom, for contacting said flat surface such that said cylinder is rotatably displaced when said linear positionable means is linearly repositioned.

12. Apparatus according to claim 11, above, wherein said linearly positionable means includes a set screw threadedly mounted in said housing along said line and having a point end contacting said flat surface.

13. Apparatus according to claim 10, above, wherein said linearly positionable means includes a set screw threadedly retained in said housing and having a longitudinal axis coincident with said line.

* * * * *